United States Patent
Nilsson et al.

(10) Patent No.: US 11,756,344 B2
(45) Date of Patent: *Sep. 12, 2023

(54) METHODS AND ENTITIES FOR ALERTING ABOUT FAILURE OF AN UNMANNED AERIAL VEHICLE

(71) Applicant: TELEFONAKTIEBOLAGET LM ERICSSON (PUBL), Stockholm (SE)

(72) Inventors: Andreas Nilsson, Gothenburg (SE); Jonas Fridén, Mölndal (SE); Fredrik Harrysson, Gothenburg (SE); Lars Manholm, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 45 days.

This patent is subject to a terminal disclaimer.

(21) Appl. No.: 17/506,356

(22) Filed: Oct. 20, 2021

(65) Prior Publication Data

US 2022/0044498 A1 Feb. 10, 2022

Related U.S. Application Data

(63) Continuation of application No. 16/466,521, filed as application No. PCT/EP2016/080937 on Dec. 14, 2016, now Pat. No. 11,195,345.

(51) Int. Cl.
*G07C 5/00* (2006.01)
*B64F 5/60* (2017.01)
(Continued)

(52) U.S. Cl.
CPC ............ *G07C 5/008* (2013.01); *B64C 39/024* (2013.01); *B64F 5/60* (2017.01); *G07C 5/0816* (2013.01);
(Continued)

(58) Field of Classification Search
CPC ........ G07C 5/008; G07C 5/0816; G07C 5/00; B64C 39/024; B64F 5/60; G08B 25/10;
(Continued)

(56) References Cited

U.S. PATENT DOCUMENTS 9,961,507 B1    5/2018  Mendelson
10,909,859 B1*  2/2021  Dodd .................... G07C 5/0816
(Continued)

FOREIGN PATENT DOCUMENTS

CN    103344240 A    10/2013
CN    104330985 A     2/2015
(Continued)

OTHER PUBLICATIONS

International Search Report and the Written Opinion of the International Searching Authority, issued in corresponding International Application No. PCT/EP2016/080937, dated Aug. 28, 2017, 19 pages.
(Continued)

*Primary Examiner* — Yonel Beaulieu
(74) *Attorney, Agent, or Firm* — Rothwell, Figg, Ernst & Manbeck, P.C.

(57) ABSTRACT

A method performed in an unmanned aerial vehicle is provided for alerting about failure of the unmanned aerial vehicle. The method comprises identifying a malfunctioning in the unmanned aerial vehicle, and transmitting to a network node, a failure report comprising the malfunctioning and/or position of the unmanned aerial vehicle. Methods in a network node, and an unmanned aerial vehicle are also provided.

15 Claims, 5 Drawing Sheets

(51) Int. Cl.
  *B64C 39/02* (2023.01)
  *G08B 25/10* (2006.01)
  *G07C 5/08* (2006.01)

(52) U.S. Cl.
  CPC ........ *G08B 25/10* (2013.01); *B64U 2201/104* (2023.01); *B64U 2201/20* (2023.01)

(58) Field of Classification Search
  CPC ...... G08B 13/1965; G08B 7/06; G08B 25/00; B64U 2201/104; B64U 2201/20; B64D 2045/0085; G01C 21/005; G01C 21/00
  See application file for complete search history.

(56) References Cited

U.S. PATENT DOCUMENTS

| | | | |
|---|---|---|---|
| 11,195,345 B2 * | 12/2021 | Nilsson | G08B 25/10 |
| 2009/0229160 A1 | 9/2009 | Elliott et al. | |
| 2012/0176218 A1 | 7/2012 | Ahn | |
| 2014/0032034 A1 | 1/2014 | Raptopoulos et al. | |
| 2014/0142787 A1 | 5/2014 | Tillotson et al. | |
| 2015/0327136 A1 | 11/2015 | Kim et al. | |
| 2016/0253907 A1 | 9/2016 | Taveira | |
| 2016/0318615 A1 | 11/2016 | Pick | |
| 2017/0004714 A1 | 1/2017 | Rhee | |
| 2017/0038771 A1 * | 2/2017 | Green | G05D 1/0033 |
| 2017/0337829 A1 | 11/2017 | Brandao et al. | |
| 2018/0029522 A1 * | 2/2018 | Gordon | B60Q 1/0017 |
| 2019/0310637 A1 | 10/2019 | Dean et al. | |
| 2020/0017114 A1 * | 1/2020 | Santoni | G06F 11/2028 |
| 2020/0193729 A1 * | 6/2020 | Nilsson | G07C 5/008 |
| 2022/0106060 A1 * | 4/2022 | Morrison | H01M 8/04544 |
| 2022/0276662 A1 * | 9/2022 | Ponda | G07C 5/0841 |

FOREIGN PATENT DOCUMENTS

| | | |
|---|---|---|
| CN | 205203391 U | 5/2016 |
| CN | 106054918 A | 10/2016 |
| DE | 102010024051 A1 | 12/2011 |
| JP | 2015207112 A | 11/2015 |
| JP | 2017521292 A | 8/2017 |
| JP | 2018012477 A | 1/2018 |
| JP | 2018070011 A | 5/2018 |
| KR | 1020110099584 A | 9/2011 |
| KR | 10-2015-0075587 A | 7/2015 |
| KR | 20160074297 A | 6/2016 |
| KR | 1020160072425 A | 6/2016 |
| KR | 10-2016-0094214 A | 8/2016 |
| KR | 20160106998 A | 9/2016 |
| KR | 1020170003336 A | 1/2017 |
| WO | 2018043284 A1 | 3/2018 |

OTHER PUBLICATIONS

Wikipedia, Unmanned aerial vehicle, available at https://web.archive.org/web/20161119112130/https://en.wikipedia.org/wiki/Unmanned_aerial_vehicle, last modified Nov. 19, 2016, 33 pages.

ABI Research, "Small Unmanned Aerial Systems Market Exceeds US$8.4 Billion by 2019, Dominated by the Commercial Sector and Driven by Commercial Applications," Jan. 5, 2015, 2 pages.

Office Action dated Oct. 11, 2019, issued in Russian Patent Application No. 2019121846/12(042570), 9 pages.

* cited by examiner

METHODS AND ENTITIES FOR ALERTING ABOUT FAILURE OF AN UNMANNED AERIAL VEHICLE

CROSS-REFERENCE TO RELATED APPLICATION

The present application is a continuation of U.S. patent application Ser. No. 16/466,521, filed Jun. 4, 2019, which is a 35 U.S.C. § 371 National Phase Entry Application from PCT/EP2016/080937, filed Dec. 14, 2016, designating the United States, the disclosures of which are incorporated herein by reference in their entireties.

TECHNICAL FIELD

The technology disclosed herein relates generally to the field of unmanned aerial vehicles, and in particular to methods for alerting about failure of an unmanned aerial vehicle, to an unmanned aerial vehicle, a network node, an unmanned aerial vehicle, a network entity, computer programs and computer program products.

BACKGROUND

Unmanned aerial vehicles (UAV), often denoted drones, are becoming more and more common and used for various purposes. Drones may, for instance, be used in aerial surveillance, professional aerial surveying, commercial and motion picture filmmaking, news gathering for journalism, observation by police forces, search and rescue operations, scientific research, disaster relief, cargo transportation etc. The small unmanned-aircraft-systems are rapidly becoming a large market, including services and applications.

With the increasing amount of unmanned aerial vehicles in use the risk of accidents also increases. The drones may, for instance, malfunction and may then pose a threat for humans when falling at high speed towards ground.

SUMMARY

An objective of the present teachings is to address the above mentioned problem. A particular objective is to provide an efficient way of warning people about drone failures. This objective and others are achieved by the methods, devices, computer programs and computer program products according to the appended independent claims, and by the embodiments according to the dependent claims.

The objective is according to an aspect achieved by a method performed in a network node for alerting about failure of an unmanned aerial vehicle. The method comprises receiving a failure report from an unmanned aerial vehicle, obtaining an estimated crash point for the unmanned aerial vehicle, and sending, based on the obtained estimated crash point, warning signals to communication devices residing within a defined area.

The method provides an efficient way to warn people about drone failures and imminent drone crashes. As a large part of the population brings along e.g. a smart phone, many persons can be reached in this way.

The objective is according to an aspect achieved by a computer program for a network node. The computer program comprises computer program code, which, when run on processing circuitry of the network node causes the network node to perform the method as above.

The objective is according to an aspect achieved by a computer program product comprising a computer program as above and a computer readable means on which the computer program is stored.

The objective is according to an aspect achieved by a network node for alerting about failure of an unmanned aerial vehicle. The network node is configured to receive a failure report from an unmanned aerial vehicle, obtain an estimated crash point for the unmanned aerial vehicle, and send, based on the obtained estimated crash point, warning signals to communication devices residing within a defined area.

The objective is according to an aspect achieved by a method performed in an unmanned aerial vehicle for alerting about a failure. The method comprises identifying a malfunctioning in the unmanned aerial vehicle, and transmitting, to a network node, a failure report.

The objective is according to an aspect achieved by a computer program for an unmanned aerial vehicle. The computer program comprising computer program code, which, when run on processing circuitry of the unmanned aerial vehicle causes the unmanned aerial vehicle to perform the method as above.

The objective is according to an aspect achieved by a computer program product comprising a computer program as above and a computer readable means on which the computer program is stored.

The objective is according to an aspect achieved by an unmanned aerial vehicle for alerting about a failure. The unmanned aerial vehicle is configured to identify a malfunctioning in the unmanned aerial vehicle, and transmit, to a network node, a failure report.

The objective is according to an aspect achieved by a method in a network entity for alerting about failure of an unmanned aerial vehicle. The method comprises receiving a failure report from an unmanned aerial vehicle via a network node of a wireless communications system, calculating, based on the failure report, an estimated crash point for the unmanned aerial vehicle, and providing, via the network node of the wireless communications system, warning signals to communication devices residing within a defined area.

The objective is according to an aspect achieved by a computer program for network entity, the computer program comprising computer program code, which, when run on processing circuitry of the network entity causes the network entity to perform the method as above.

The objective is according to an aspect achieved by a computer program product comprising a computer program as above and a computer readable means on which the computer program is stored.

The objective is according to an aspect achieved by a network entity for alerting about failure of an unmanned aerial vehicle. The network entity is configured to: receive a failure report from an unmanned aerial vehicle via a network node of a wireless communications system, calculate, based on the failure report, an estimated crash point for the unmanned aerial vehicle, and provide, via the network node of the wireless communications system, warning signals to communication devices residing within a defined area.

Further features and advantages of the embodiments of the present teachings will become clear upon reading the following description and the accompanying drawings.

DETAILED DESCRIPTION

Figure 1:
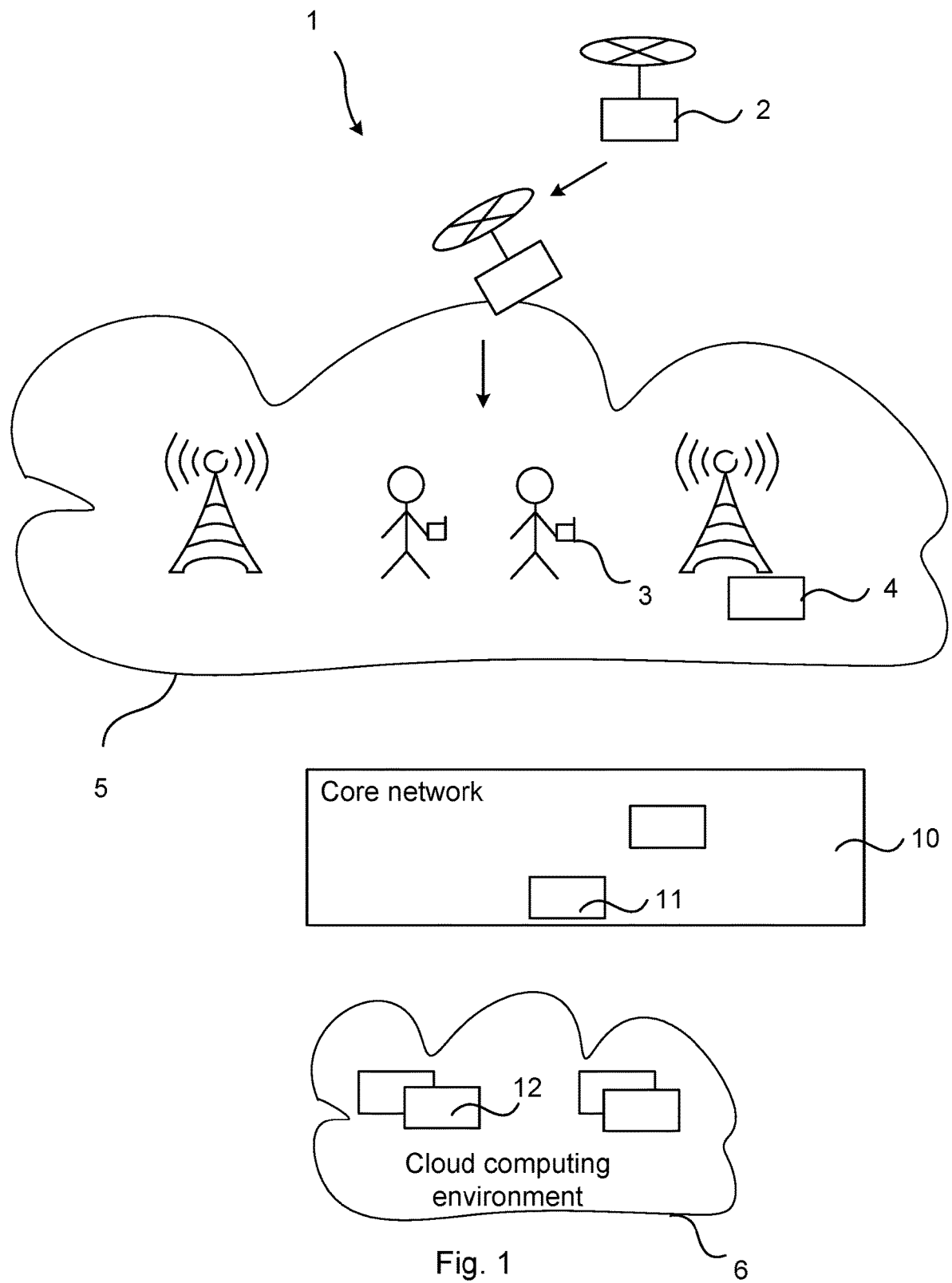
FIG. 1 illustrates an environment in which embodiments according to the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, methods and devices are provided for alerting persons in the vicinity of an unmanned aerial vehicle experiencing some type of malfunctioning. Nowadays, wireless communication network operators have a large number of users, each user having one or more devices, such as for instance communication devices (in the following exemplified by user equipment, UE). In accordance with the present teachings, this is taken advantage of for providing an efficient warning mechanism for quickly warning a high number of persons.

FIG. 1 illustrates a system 1 in which embodiments according to the present teachings may be implemented. In particular, an example of an unmanned aerial vehicle 2, in the following also denoted drone 2, that experience a failure and crashes down towards humans below. Such drone failure may cause injuries to the humans below.

The drone 2 may be provided with a communication unit such that it is able to communicate in a communications system e.g. over a cellular radio access network, for example Long Term Evolution (LTE) or 5G. A communications system 1 is illustrated comprising a number of network nodes. The communications system 1 may, for instance, comprise a 2G, 3G, 4G or 5G network. The communications system 1 comprises a wireless access network 5, in turn comprising a number of network nodes 4 (e.g. radio access nodes). The communications system 1 may also comprise a core network comprising core network nodes 11 (also denoted backbone nodes). The communications system 1 may comprise, have access to or be interconnected with other network elements, for instance, network nodes 12 of a cloud computing environment 6 comprising a number of cloud computing nodes 12, or other packet data networks, such as Internet.

The network node 4 may provide and control one or more respective coverage area(s), often denoted cell(s) C1, C2, etc. Further, the network node 4 may have wireless communication with drones 2 having a communication unit for receiving such signaling and transmitting signaling according to the access technology at hand. The network node 4 may implement different wireless access technologies, such as 3G, 4G, LTE or 5G, to mention a few examples. Further, the network node 4 may be denoted in different ways depending on standards implemented in the communications system 1. For instance, while an access node handling the wireless communication with devices is known as base transceiver station (BTS) in Global System for Mobile Communications (GSM), it is known as evolved Node B or eNB in Long Term Evolution (LTE) systems. These network nodes 4 communicate wirelessly with communication devices 3, e.g. user equipment (UE) 3. The network node 4 may also, according to embodiments of the present teachings, communicate wirelessly with drones 2 equipped with a communication module adapted to the wireless communication standard used in the communications system 1. The drone communication can be based, for instance, on LTE (or 5G), on Vehicle-to-everything (V2X) communication, or similar with both network assisted and direct Device-to-Device (D2D) communication.

A drone 2 experiencing some malfunctioning (e.g. having identified a device not performing or acting as expected or having identified low battery voltage/lack of fuel) may send a failure report to a network node 4 e.g. to an access point for wireless communication such as a base station, eNB or eNodeB. The drone 2 may send the failure report to close by network nodes 4 which in turn may send warning signals to the UEs 3 being in the vicinity of the estimated position where the drone 2 is expected to hit the ground.

The failure signal transmitted from the drone 2 to the network nodes 4 may comprise various information. For instance, the failure report may comprise information such as its position, height above ground level, its velocity, acceleration, weight of the drone, flying capability or status (e.g. "free falling" or semi-controlled landing due to failure of some of the motors, possibly compiled as remaining flying force) and the wind and weather conditions etc. Based on this information the network nodes 4 may estimate when and where the drone 2 will crash. A warning message comprising all or some of this information may then be sent automatically to all UEs in the vicinity of the estimated crashing position. In the UEs 3 this may be presented in different ways. The warning message may, for instance, appear as a text alert together with a warning sound and some clear indication, e.g. text and/or indicated on a map, on when and where there is an estimated drone crash.

Depending on the current height and status of the drone 2 when the failure occurs, it will take different amount of time until the drone 2 hits the ground. This implies that people will have shorter or longer time to get in to safety before the drone crashes. If a drone failure occurs at a relatively low height, it might take too long time for the users to first receive the warning signal, then take up their UE 3 out from the pocket and react on the warning signal. In some embodiments, as one way to mitigate this problem is, for instance, to standardize a warning signal for drone failures such that instantly upon hearing the warning signal from the UE 3 (being e.g. in a bag or pocket), the user knows that a flying object is about to crash close by. In some embodiments, in order to alert users more efficiently, objects in the vicinity that are also connected to the network 1 can be configured to make sounds and flashes with their lights. Examples on such objects are lamp posts, vehicles, machines etc.

In the description only unmanned flying vehicles are mentioned, however it is noted that the present teachings may also be applied for flying vehicles with pilots.

In one embodiment the communications system 1 transmits the warning signals to the users when a drone 2 unexpectedly loses connection with the network. This could happen for example if the battery discharges at the drone.

In one embodiment a colored (e.g. red) light on the drone 2 starts blinking when it has a failure and falls down. This is especially useful in case it is dark outside and it otherwise would be difficult to spot the drone 2.

In the case of an LTE system and if the drone is a flying eNodeB the eNodeB can use System-Information Blocks (SIBs) to send the warning to the relevant UEs. If the drone is not an eNodeB, the warning must be transferred via an eNodeB and to the core network, where the decision to send a warning using a SIB is taken.

In order to warn the users and other persons located in vicinity of a probable and possibly imminent drone failure, a warning sound may in addition be sent out directly from the falling drone 2. That is, the drone may in addition itself send out warning sounds in order to warn people.

Figure 2:
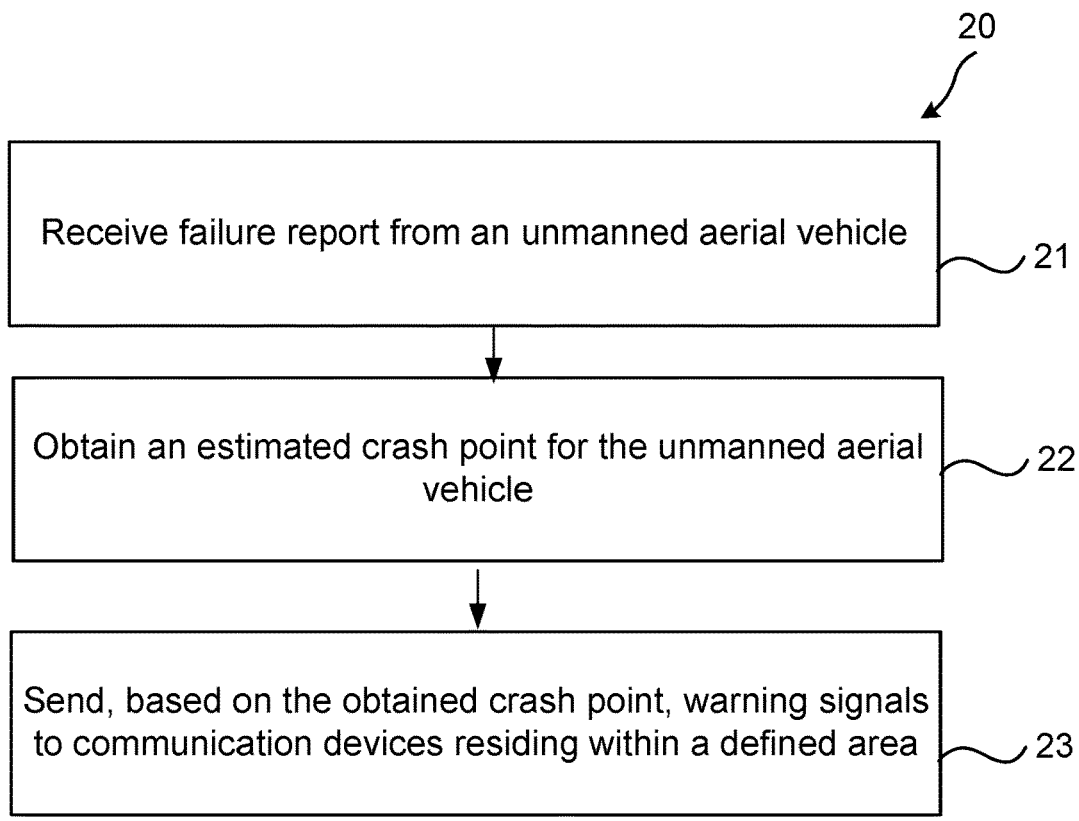
FIG. 2 illustrates a flow chart over steps of an embodiment of a method in a network node in accordance with the present teachings.

FIG. 2 illustrates a flow chart over steps of an embodiment of a method in a network node in accordance with the present teachings. The method 20 may be performed in a network node 4 for alerting about failure of an unmanned aerial vehicle 2. The network node 4 may, for instance, be a radio access node (e.g. eNB).

The method 20 comprises receiving 21 a failure report from an unmanned aerial vehicle 2.

The method 20 comprises obtaining 22 an estimated crash point for the unmanned aerial vehicle 2. The network node 4 may obtain the estimated crash point in different ways; it may, for instance, calculate the estimated crash point based on data in the failure report. In other embodiments, the network node may obtain the estimated crash point by sending the failure report to e.g. a cloud computing node and receive the estimated crash point in return.

The method 20 comprises sending 23, based on the obtained estimated crash point, warning signals to communication devices 3 residing within a defined area. The network node may send the warning signals immediately if the estimated crash point is outside its coverage area(s) or it may request one or more neighboring radio access nodes to send the warning signals if the estimated crash point is in an area covered by the neighboring radio access node.

The method 20 provides an efficient way to warn people about drone failures and imminent drone crashes. As a large part of the population brings along e.g. a smart phone, many persons can be reached in this way.

The method 20 may be implemented in a radio access node, in which case the radio access node may perform all steps: receive failure report, estimate the crash point and send the warning signals.

The method 20 may be implemented in a cloud computing node (also described later), in which case it receives the failure report via the radio access node that received the failure report from the drone, calculates the estimated crash point, and sends the warning signals via a selected radio access node, in particular to the radio access node serving communications devices in an area including the estimated crash point. In such embodiments, the radio access node simply forwards the failure report to the cloud computing node and a radio access node (which may, but need not, be the same that forwarded the failure report) receives instructions to send warning signals.

The method 20 may also be implemented in a distributed manner, wherein different nodes are involved. For instance, when the method is implemented in the radio access node, it may obtain the estimated crash point by sending the failure report to a cloud computing network, which calculates the estimated crash point, and sends it to the radio access node. That is, the radio access node obtains the estimated crash point by receiving it from the cloud computing node.

The method 20 may also comprise determining in which area(s) warning signals are to be sent. The network node 4 may, based on the determined area(s), in turn determine which network node(s) of the wireless communication systems that should send the warning signals. That is, it is not necessarily the network node 4 that received the failure report that is the network node 4 that should send the warning signals for warning users residing within the determined area. In some embodiments, the warning signals are sent in multiple areas, for instance, when there is a high uncertainty in the crash point due to e.g. whether conditions.

In an embodiment, the sending 23 comprises sending the warning signals to communication devices 3 residing within a defined area surrounding the estimated crash point for the unmanned aerial vehicle 2. The defined area may be the coverage area (one or more cells) provided by the network node 4 (when the network node 4 is a radio access node). In other instances, the defined area may be the coverage area (one or more cells) provided by a network node (in particular radio access node) serving communication devices 3 residing within the area where the drone is expected to crash. That is, a first radio access node may receive the drone failure report, but the estimated crash point may be in a coverage area provided by second radio access node. The first network node may then send the warning signals via the second network node, e.g. by transmitting a message to the second network node requesting it to send the warning signals.

In some embodiments, the method 20 comprises establishing that a connection to the unmanned aerial vehicle 2 has been lost and sending, in response thereto, the warning signals. The drone 2 may be configured to regularly send messages to the network node 4, and if one or more such messages fail to arrive, the network node 4 may assume that the drone 2 may experience a failure and send the warnings signals.

In various embodiments, the warning signals comprises one or both of: audible signals and text message informing about failure of the unmanned aerial vehicle 2.

In various embodiments, the method 20 comprises obtaining information on an estimated point in time and/or time remaining to the estimated crash and providing the information to the communication devices 3 residing within the defined area.

In various embodiments, the obtaining 22 comprises calculating, in the network node 4, the estimated crash point based on the failure report.

In various embodiments, the obtaining 22 comprises forwarding the failure report to a network entity 10, 12, and receiving, in response from the network entity 12, the estimated crash point.

In various embodiments, the obtaining 22 comprises receiving, from the unmanned aerial vehicle 2, the estimated crash point. The drone 2 may calculate its estimated crash point and send it in the failure report.

There are thus different ways that the network node 4 can obtain knowledge of an estimated crash point for the unmanned aerial vehicle 2.

The network node 4 may be a network node such as a base station, and may be arranged to send the warning signals to communication devices 3 residing with its coverage area, or residing within neighboring network nodes. In the latter case, the network node 4 may send the warning signals via the neighboring network nodes.

Figure 3:
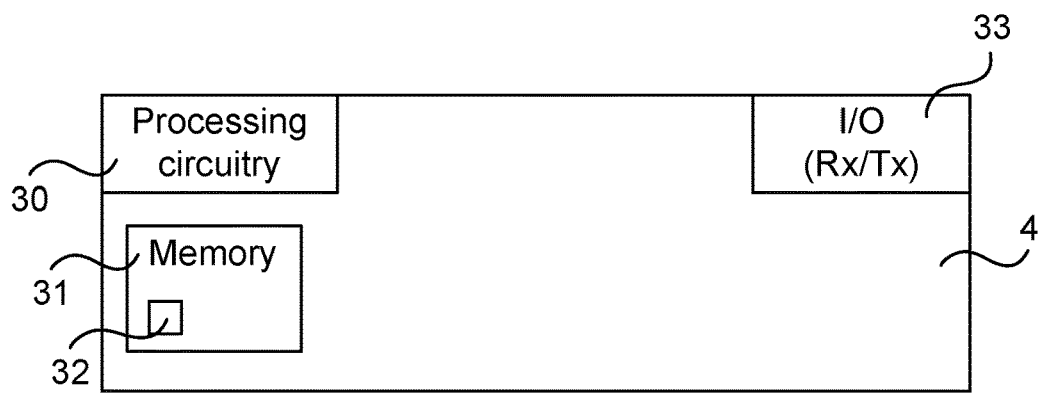
FIG. 3 illustrates schematically a network node and means for implementing embodiments of the method in accordance with the present teachings.

FIG. 3 illustrates schematically a network node and means for implementing embodiments of the method in accordance with the present teachings. The network node 4 comprises processing circuitry 30, which may be any combination of one or more of a suitable central processing unit (CPU), multiprocessor, microcontroller, digital signal processor (DSP), etc., capable of executing software instructions stored in a computer program product 31, e.g. in the form of a storage medium 31. The processing circuitry 30 may further be provided as at least one application specific integrated circuit (ASIC), or field programmable gate array (FPGA).

The processing circuitry 30 is configured to cause the network node 4 to perform a set of operations, or steps, e.g. as described in relation to FIG. 2. For example, the storage medium 31 may store the set of operations, and the processing circuitry 30 may be configured to retrieve the set of operations from the storage medium 31 to cause the network node 4 to perform the set of operations. The set of operations may be provided as a set of executable instructions. The processing circuitry 30 is thereby arranged to execute methods as disclosed herein.

The storage medium 31 may also comprise persistent storage, which, for example, can be any single one or combination of magnetic memory, optical memory, solid state memory or even remotely mounted memory.

The network node 4 may also comprise an input/output device 33 for communicating with other entities and devices. The input/output device 33 may be an interface and may, for instance, comprise a protocol stack, for communication with other devices or entities. The input/output device 33 may be used for receiving data input and for outputting data, and/or receiving/transmitting wireless signaling.

A network node 4 for alerting about failure of an unmanned aerial vehicle 2 is provided. The network node 4 is configured to:
receive a failure report from an unmanned aerial vehicle 2,
obtain an estimated crash point for the unmanned aerial vehicle 2, and
send, based on the obtained estimated crash point, warning signals to communication devices 3 residing within a defined area.

The network node 4 may be configured to perform the above steps e.g. by comprising processing circuitry 30 and memory 31, the memory 31 containing instructions executable by the processing circuitry 30, whereby the network node 4 is operative to perform the steps. That is, in an embodiment, a network node 4 is provided. The network node 4 comprises processing circuitry 30 and memory 31, the memory 31 containing instructions executable by the processing circuitry 30, whereby network node 4 is operative to: receive a failure report from an unmanned aerial vehicle, obtain an estimated crash point for the unmanned aerial vehicle, and send, based on the obtained estimated crash point, warning signals to communication devices residing within a defined area.

In an embodiment, the network node 4 is configured to send the warning signals to communication devices 3 residing within a defined area surrounding the estimated crash point for the unmanned aerial vehicle 2.

In an embodiment, the network node 4 is configured to establish that a connection to the unmanned aerial vehicle 2 has been lost and to send, in response thereto, the warning signals.

In various embodiments, the warning signals comprises one or both of: audible signals and text message informing about failure of the unmanned aerial vehicle 2.

In an embodiment, the network node 4 is configured to obtain information on an estimated point in time and/or time remaining to the estimated crash and providing the information to the communication devices 3 residing within the defined area.

In an embodiment, the network node 4 is configured to obtain by calculating, in the network node 4, the estimated crash point based on the failure report.

In an embodiment, the network node 4 is configured to obtain by forwarding the failure report to a network entity 10, 12, and receiving, in response from the network entity 12, the estimated crash point.

In an embodiment, the network node 4 is configured to obtain by receiving, from the unmanned aerial vehicle 2, the estimated crash point.

The present teachings also encompass a computer program 32 for a network node 4 for alerting about failure of an unmanned aerial vehicle 2. The computer program 32 comprises computer program code, which, when executed on at least one processor on the network node 4, causes the network node 4 to perform the method according to any of the described embodiments.

The present teachings also encompass computer program products 31 for a network node 4 for alerting about failure of an unmanned aerial vehicle 2. The computer program product 31 comprises the computer program 32 for implementing the embodiments of the methods as described, and a computer readable means on which the computer program 32 is stored. The computer program product, or the memory, thus comprises instructions executable by the processor 30. Such instructions may be comprised in a computer program, or in one or more software modules or function modules. The computer program product 31 may be any combination of random access memory (RAM) or read only memory (ROM), Flash memory, magnetic tape, Compact Disc (CD)-ROM, digital versatile disc (DVD), Blu-ray disc etc.

Figure 4:
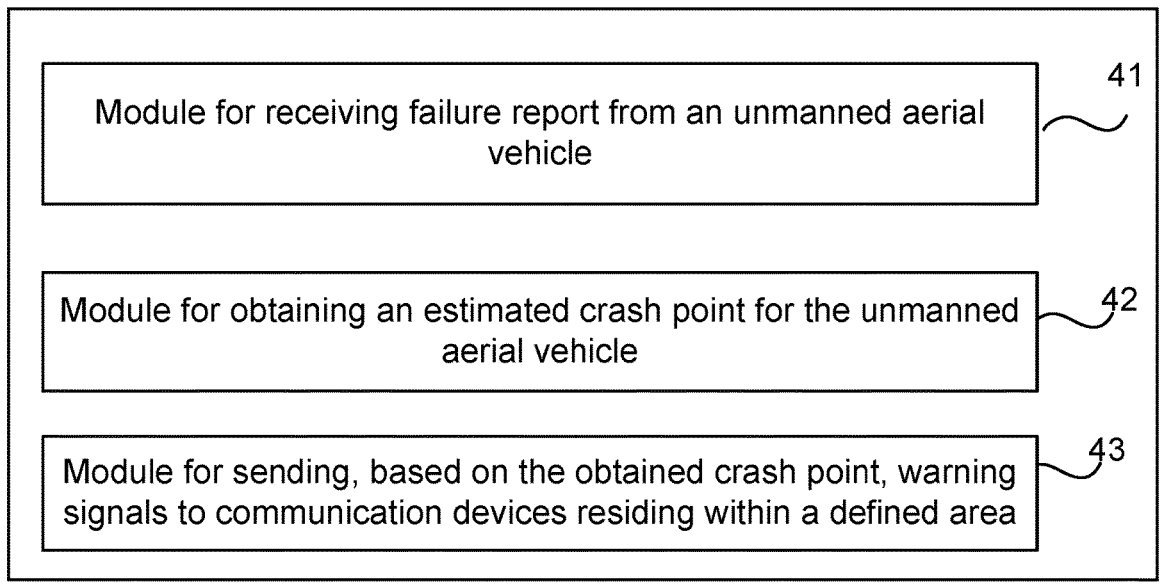
FIG. 4 illustrates a network node comprising function modules/software modules for implementing embodiments in accordance with the present teachings.

FIG. 4 illustrates a network node comprising function modules/software modules for implementing embodiments in accordance with the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 20 that has been described in various embodiments.

A network node 4 is provided for alerting about failure of an unmanned aerial vehicle. The network node 4 comprises a first module 41 for receiving a failure report from an unmanned aerial vehicle. Such first module 41 may, for instance, comprise receiving circuitry or an input device.

The network node 4 comprises a second module 42 for obtaining an estimated crash point for the unmanned aerial vehicle. Such second module 42 may, for instance, comprise processing circuitry adapted to estimate a crash point.

The network node 4 comprises a third module 43 for sending, based on the obtained estimated crash point, warning signals to communication devices 3 residing within a defined area. Such third module 43 may, for instance, comprise transmitting circuitry or an output device.

It is noted that one or more of the modules 41, 42, 43 may be replaced by units.

Figure 5:
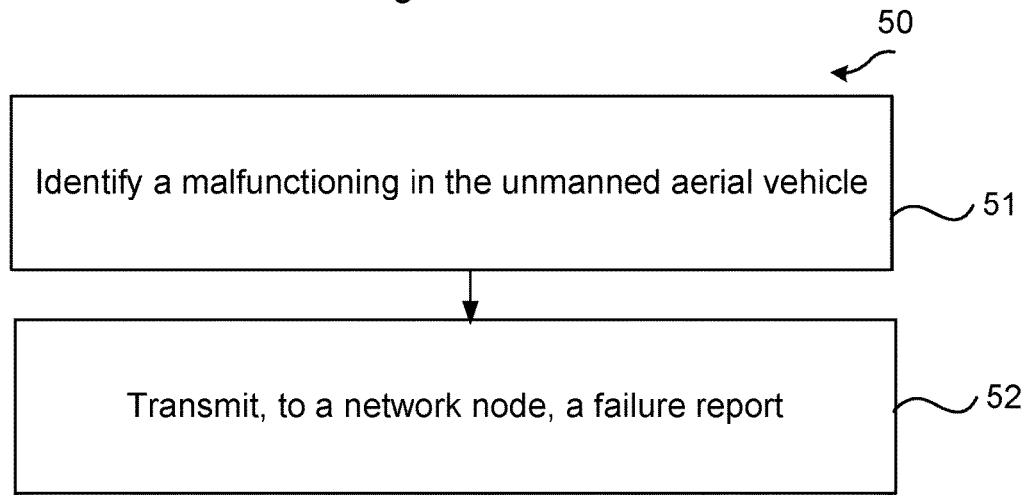
FIG. 5 illustrates a flow chart over steps of an embodiment of a method in an unmanned aerial vehicle in accordance with the present teachings.

FIG. 5 illustrates a flow chart over steps of an embodiment of a method in an unmanned aerial vehicle in accordance with the present teachings.

The method 50 is performed in an unmanned aerial vehicle 2 for alerting about a failure. The method 50 comprises identifying 51 a malfunctioning in the unmanned aerial vehicle 2. The establishing can, for instance, comprise detecting that some function is not working as expected, or that some measurement values differs from reference values more than allowed.

The method 50 comprises transmitting 52, to a network node 4, 10, 12, a failure report. The failure report may be included in a message format and signaling conforming to the wireless standards implemented in the radio access network 5.

If the unmanned aerial vehicle 2 at some point malfunctions, i.e. fails to operate normally, it can quickly take action in order to warn persons, in particular persons residing within an area in which it is expected to crash.

In an embodiment, the method 50 comprises one or both of: sending audible signals and light signals to alert about the malfunctioning.

In various embodiments, the method 50 comprises providing, in the failure report, one of more of: position of the unmanned aerial vehicle 2, altitude of the unmanned aerial vehicle 2, velocity of the unmanned aerial vehicle 2, weight of the unmanned aerial vehicle 2, data related to the unmanned aerial vehicle 2, data related to space surrounding the unmanned aerial vehicle 2, temperature.

Figure 6:
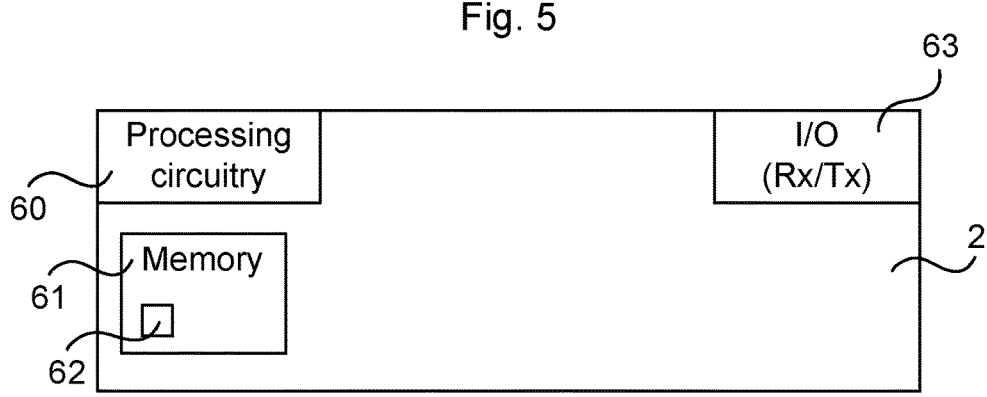
FIG. 6 illustrates schematically an unmanned aerial vehicle and means for implementing embodiments in accordance with the present teachings.

FIG. 6 illustrates schematically an unmanned aerial vehicle and means for implementing embodiments in accordance with the present teachings. The unmanned aerial vehicle 2 comprises processing circuitry 60, which may be any combination of one or more of a suitable central processing unit (CPU), multiprocessor, microcontroller, digital signal processor (DSP), etc., capable of executing software instructions stored in a computer program product 61, e.g. in the form of a storage medium 61. The processing circuitry 60 may further be provided as at least one application specific integrated circuit (ASIC), or field programmable gate array (FPGA).

The processing circuitry 60 is configured to cause the unmanned aerial vehicle 2 to perform a set of operations, or steps, e.g. as described in relation to FIG. 5. For example, the storage medium 61 may store the set of operations, and the processing circuitry 60 may be configured to retrieve the set of operations from the storage medium 61 to cause the unmanned aerial vehicle 2 to perform the set of operations. The set of operations may be provided as a set of executable instructions. The processing circuitry 60 is thereby arranged to execute methods as disclosed herein.

The storage medium 61 may also comprise persistent storage, which, for example, can be any single one or combination of magnetic memory, optical memory, solid state memory or even remotely mounted memory.

The unmanned aerial vehicle 2 may also comprise an input/output device 63 for communicating with other entities and devices. The input/output device 63 may be an interface and may, for instance, comprise a protocol stack, for communication with other devices or entities. The input/output device 63 may be used for receiving data input and for outputting data, and/or receiving/transmitting wireless signaling.

An unmanned aerial vehicle 2 is provided for alerting about a failure. The unmanned aerial vehicle 2 is configured to:

identify a malfunctioning in the unmanned aerial vehicle 2, and transmit, to a network node 4, 10, 12, a failure report.

The unmanned aerial vehicle 2 may be configured to perform the above steps e.g. by comprising processing circuitry 30 and memory 61, the memory 61 containing instructions executable by the processing circuitry 60, whereby the unmanned aerial vehicle 2 is operative to perform the steps. That is, in an embodiment, an unmanned aerial vehicle 2 is provided. The unmanned aerial vehicle 2 comprises processing circuitry 60 and memory 61, the memory 61 containing instructions executable by the processing circuitry 60, whereby unmanned aerial vehicle is operative to identify a malfunctioning in the unmanned aerial vehicle, and transmit, to a network node a failure report.

In an embodiment, the unmanned aerial vehicle 2 is configured to do one or both of: sending audible signals and light signals to alert about the malfunctioning.

In various embodiments, the unmanned aerial vehicle 2 is configured to provide, in the failure report, one of more of: position of the unmanned aerial vehicle 2, altitude of the unmanned aerial vehicle 2, velocity of the unmanned aerial vehicle 2, weight of the unmanned aerial vehicle 2, data related to the unmanned aerial vehicle 2, data related to space surrounding the unmanned aerial vehicle 2, temperature.

The present teachings also encompass a computer program 62 for an unmanned aerial vehicle 2 for alerting about failure. The computer program 62 comprises computer program code, which, when executed on at least one processor on the unmanned aerial vehicle 2, causes the unmanned aerial vehicle 2 to perform the method according to any of the described embodiments.

The present teachings also encompass computer program products 61 for an unmanned aerial vehicle 2 for alerting about failure. The computer program product 61 comprises the computer program 62 for implementing the embodiments of the methods as described, and a computer readable means on which the computer program 62 is stored. The computer program product, or the memory, thus comprises instructions executable by the processor 60. Such instructions may be comprised in a computer program, or in one or more software modules or function modules. The computer program product 61 may be any combination of random access memory (RAM) or read only memory (ROM), Flash memory, magnetic tape, Compact Disc (CD)-ROM, digital versatile disc (DVD), Blu-ray disc etc.

Figure 7:
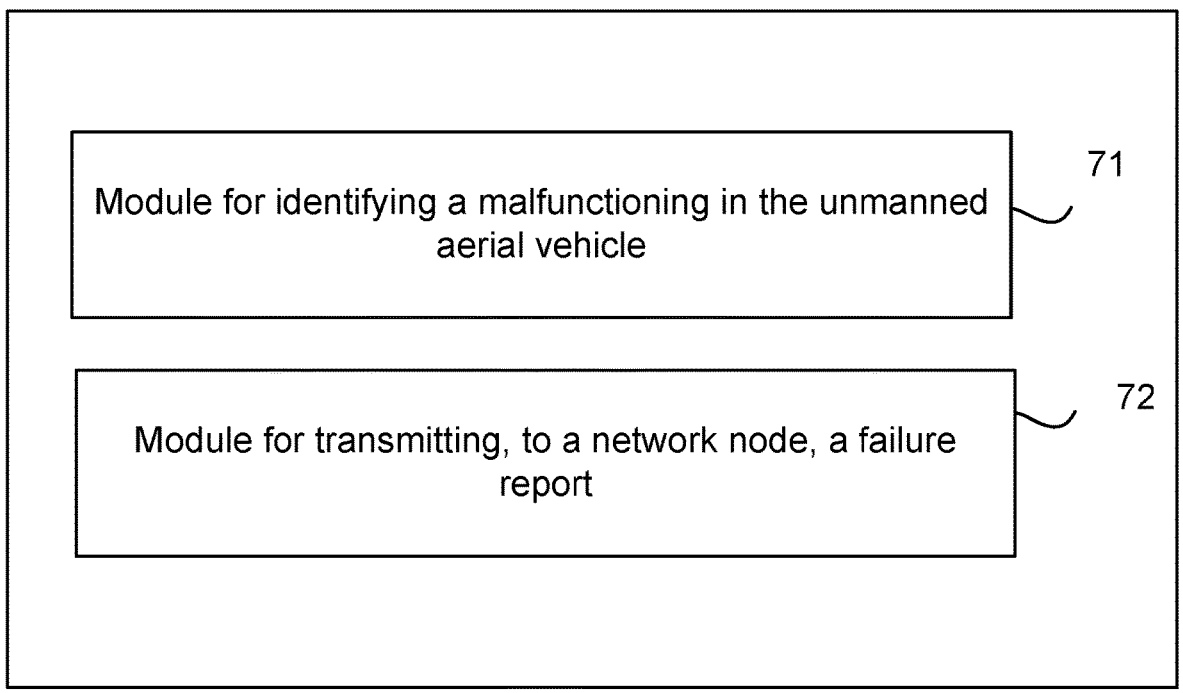
FIG. 7 illustrates an unmanned aerial vehicle comprising function modules/software modules for implementing embodiments of the present teachings.

FIG. 7 illustrates an unmanned aerial vehicle comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 50 that has been described in various embodiments.

An unmanned aerial vehicle is provided for alerting about a failure. The unmanned aerial vehicle comprises a first module 71 for identifying a malfunctioning in the unmanned aerial vehicle. Such first module 71 may, for instance, comprise processing circuitry adapted to identify such malfunctioning.

The unmanned aerial vehicle comprises a second module 72 for transmitting, to a network node 4, 10, 12, a failure report. Such second module 72 may, for instance, comprise transmitting circuitry or an output device.

It is noted that one or both of the modules 71, 72 may be replaced by units.

Figure 8:
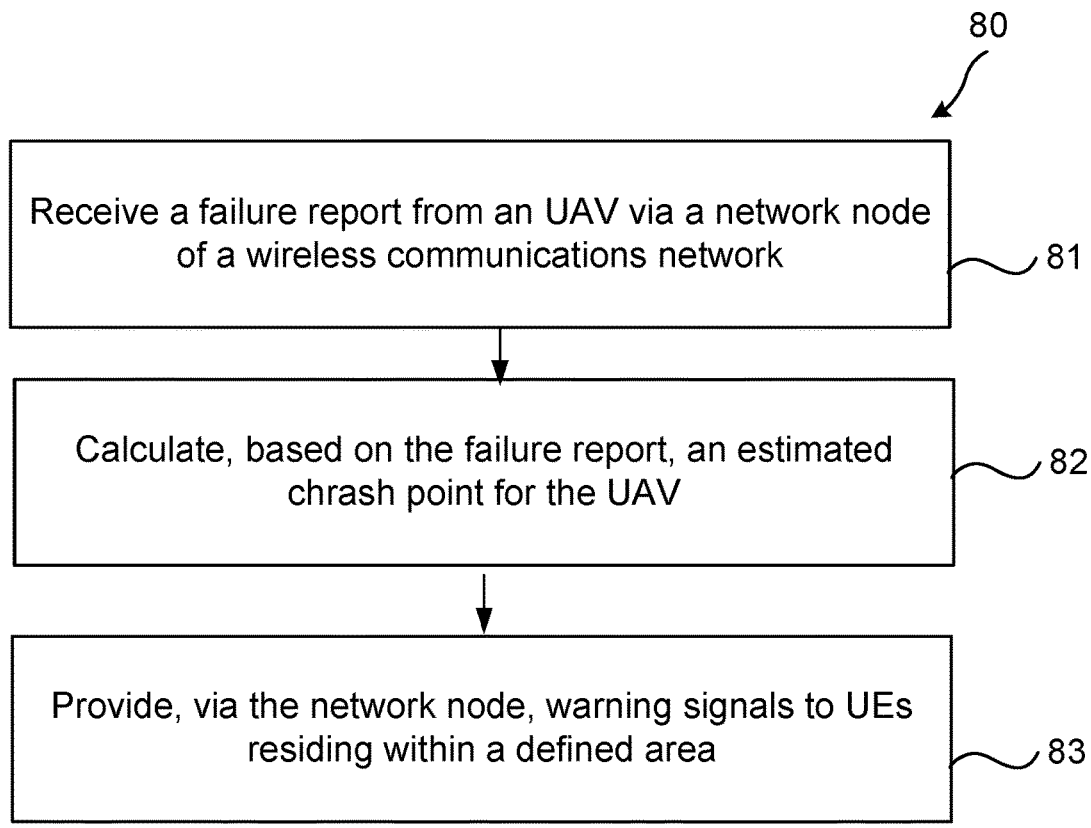
FIG. 8 illustrates a flow chart over steps of an embodiment of a method in a network entity in accordance with the present teachings.

FIG. 8 illustrates a flow chart over steps of an embodiment of a method in a network entity in accordance with the present teachings.

A method 80 in a network entity 12 is provided for alerting about failure of an unmanned aerial vehicle 2. The method 80 comprises receiving 81 a failure report from an unmanned aerial vehicle 2 via a network node 4 of a wireless communications system. The network entity 12 may, for instance, be a cloud computing node, and receive the failure report from a radio access node 4, via core network nodes 11 and other intermediate nodes.

The method 80 comprises calculating 82, based on the failure report, an estimated crash point for the unmanned aerial vehicle 2. Depending on what information the failure report comprises, the crash point can be estimated in different ways and with different accuracy. If the failure report comprises only few data, e.g. position of the drone 2 and type of drone, the network entity 12 may obtain further information from other network entities, e.g. about weather conditions (wind etc.) at the obtained position and thereby improve the estimation on the crash point compared to calculating the crash point merely on e.g. position and type of drone. The calculating may also comprise determining in which area warning signals are to be sent. The network entity 12 may, based on the determined area, in turn determine which network nodes of the wireless communication systems that should send the warning signals. In other embodiments, the warning signals are sent in multiple areas, for instance, when there is a high uncertainty in the crash point due to e.g. whether conditions.

The method 80 comprises providing 83, via the network node 4 of the wireless communications system, warning signals to communication devices 3 residing within a defined area. The warning signals may be sent in a way corresponding to the reception of the failure report. That is, if network entity 12 is a cloud computing node, it may send the warning signals, or request for transmission of warning signals, to a radio access node 4, via core network nodes 11 and other intermediate nodes.

In various embodiments, the failure report comprises one of more of: position of the unmanned aerial vehicle 2, altitude of the unmanned aerial vehicle 2, velocity of the unmanned aerial vehicle 2, weight of the unmanned aerial vehicle 2, data related to the unmanned aerial vehicle 2, data related to space surrounding the unmanned aerial vehicle 2, temperature, and the calculating 82 comprises calculating the estimated crash point based on one or more thereof.

Figure 9:
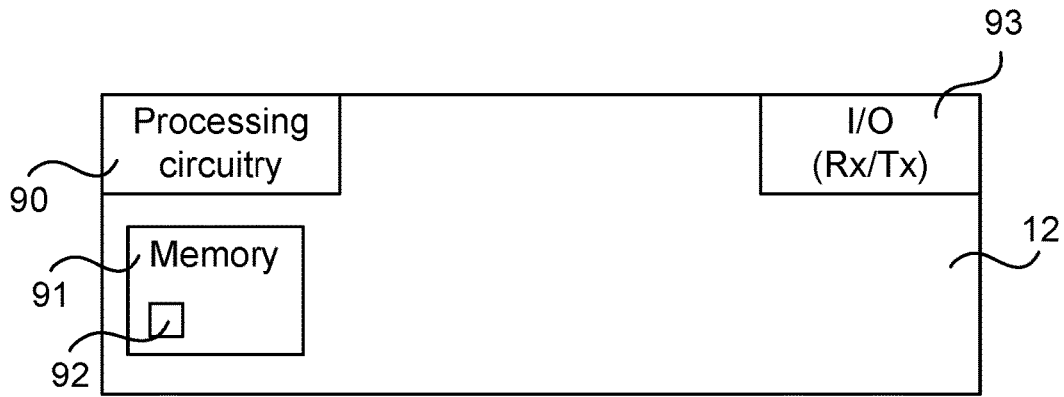
FIG. 9 illustrates schematically a network entity and means for implementing embodiments in accordance with the present teachings.

FIG. 9 illustrates schematically a network entity 12 and means for implementing embodiments in accordance with the present teachings. The network entity 12 comprises processing circuitry 90, which may be any combination of one or more of a suitable central processing unit (CPU), multiprocessor, microcontroller, digital signal processor (DSP), etc., capable of executing software instructions stored in a computer program product 91, e.g. in the form of a storage medium 91. The processing circuitry 90 may further be provided as at least one application specific integrated circuit (ASIC), or field programmable gate array (FPGA).

The processing circuitry 90 is configured to cause the network entity 12 to perform a set of operations, or steps, e.g. as described in relation to FIG. 8. For example, the storage medium 91 may store the set of operations, and the processing circuitry 90 may be configured to retrieve the set of operations from the storage medium 91 to cause the network entity 12 to perform the set of operations. The set of operations may be provided as a set of executable instructions. The processing circuitry 90 is thereby arranged to execute methods as disclosed herein.

The storage medium 91 may also comprise persistent storage, which, for example, can be any single one or combination of magnetic memory, optical memory, solid state memory or even remotely mounted memory.

The network entity 12 may also comprise an input/output device 93 for communicating with other entities and devices. The input/output device 93 may be an interface and may, for instance, comprise a protocol stack, for communication with other devices or entities. The input/output device 93 may be used for receiving data input and for outputting data.

A network entity 12 is provided for alerting about failure of an unmanned aerial vehicle 2. The network entity 12 is configured to:

receive a failure report from an unmanned aerial vehicle 2 via a network node 4 of a wireless communications system, calculate, based on the failure report, an estimated crash point for the unmanned aerial vehicle 2, and provide, via the network node 4 of the wireless communications system, warning signals to communication devices 3 residing within a defined area.

The network entity 12 may be configured to perform the above steps e.g. by comprising processing circuitry 90 and memory 91, the memory 91 containing instructions executable by the processing circuitry 90, whereby the network entity 12 is operative to perform the steps. That is, in an embodiment, a network entity 12 is provided. The network entity 12 comprises processing circuitry 90 and memory 91, the memory 91 containing instructions executable by the processing circuitry 90, whereby network entity is operative to: receive a failure report from an unmanned aerial vehicle 2 via a network node 4 of a wireless communications system, calculate, based on the failure report, an estimated crash point for the unmanned aerial vehicle 2, and provide, via the network node 4 of the wireless communications system, warning signals to communication devices 3 residing within a defined area.

In various embodiments, the failure report comprises one of more of: position of the unmanned aerial vehicle 2, altitude of the unmanned aerial vehicle 2, velocity of the unmanned aerial vehicle 2, weight of the unmanned aerial vehicle 2, data related to the unmanned aerial vehicle 2, data related to space surrounding the unmanned aerial vehicle 2, temperature, and the configured to by calculating the estimated crash point based on one or more thereof.

Figure 10:
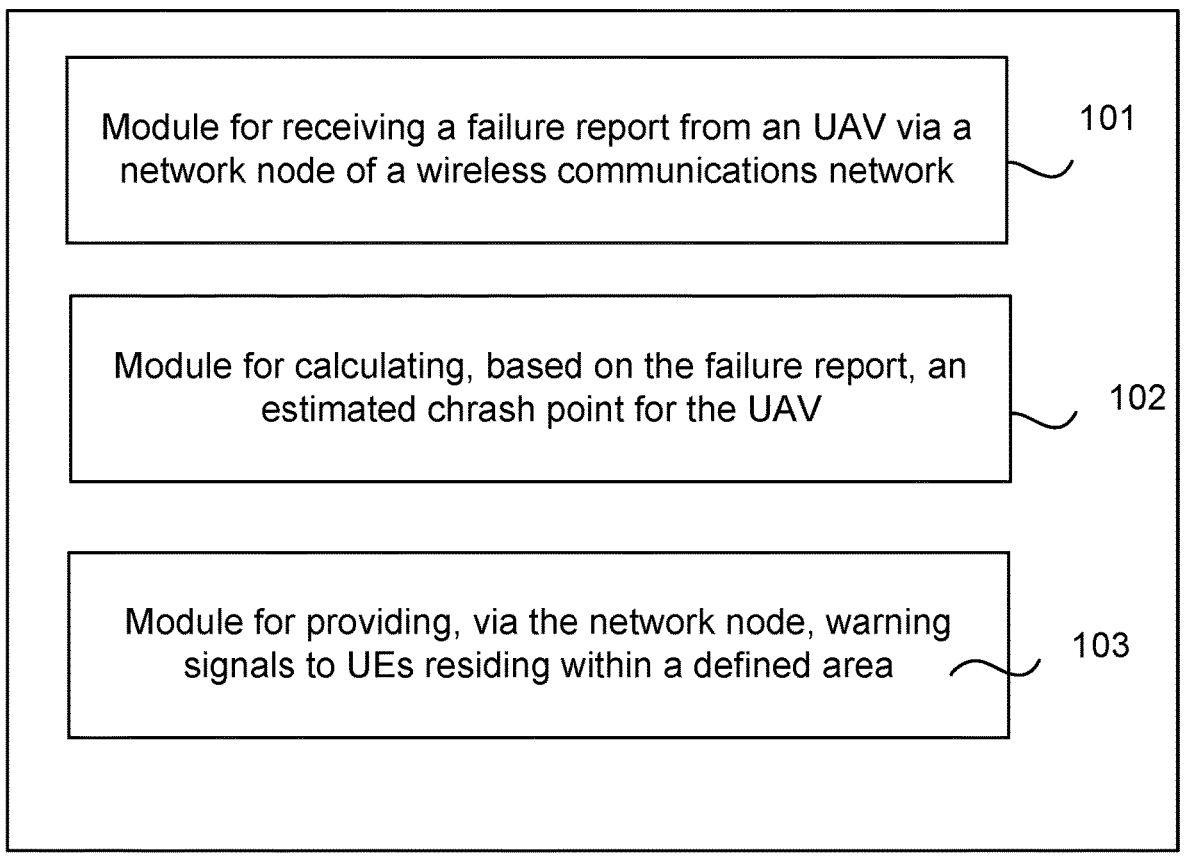
FIG. 10 illustrates a network entity comprising function modules/software modules for implementing embodiments of the present teachings.

FIG. 10 illustrates a network entity comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 50 that has been described in various embodiments.

An network entity is provided for alerting about a failure of an unmanned aerial vehicle. The network entity comprises a first module 101 for receiving a failure report from an unmanned aerial vehicle 2 via a network node 4 of a wireless communications system. Such first module 101 may, for instance, comprise receiving circuitry or an input device.

The network entity comprises a second module 102 for calculating, based on the failure report, an estimated crash point for the unmanned aerial vehicle 2. Such second module 102 may, for instance, comprise processing circuitry adapted to calculate an estimated crash point based on a failure report.

The network entity comprises a third module 103 for providing, via the network node of the wireless communications system, warning signals to communication devices residing within a defined area. Such third module 103 may, for instance, comprise receiving circuitry or an input device.

It is noted that one or more of the modules 101, 102, 103 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in an unmanned aerial vehicle for alerting about a failure, the method comprising:
   identifying a malfunctioning in the unmanned aerial vehicle, wherein the malfunctioning comprising low battery voltage or lack of fuel, and
   transmitting to a network node, a failure report, wherein the failure report comprises the malfunctioning and/or position of the unmanned aerial vehicle.

2. The method as claimed in claim 1, comprising: sending audible signals and/or light signals to alert about the malfunctioning.

3. The method as claimed in claim 1, wherein the failure report further comprising at least one of: altitude of the unmanned aerial vehicle, velocity of the unmanned aerial vehicle, weight of the unmanned aerial vehicle, data related to the unmanned aerial vehicle, temperature.

4. The method as claimed in claim 1, wherein the failure report further comprises: flying capability or status of the unmanned aerial vehicle, wherein the flying status comprises one of: free falling or semi-controlled landing.

5. The method as claimed in claim 3, wherein the failure report further comprises: flying capability or status of the unmanned aerial vehicle, wherein the flying status comprises one of: free falling or semi-controlled landing.

6. A method performed in a network node about failure of an unmanned aerial vehicle, the method comprising:
   receiving a failure report from an unmanned aerial vehicle, wherein the failure report comprises malfunctioning of the unmanned aerial vehicle and/or position of the unmanned aerial vehicle, and
   obtaining an estimated crash point of the unmanned aerial vehicle based on the received failure report.

7. The method as claimed in claim 6, further comprising: sending warning signals to communication devices residing within a defined area surrounding the estimated crash point of the unmanned aerial vehicle.

8. The method as claimed in claim 6, further comprising: obtaining information on an estimated point in time and/or time remaining to the estimated crash; and providing the information to the communication devices residing within the defined area.

9. The method as claimed in claim 6, wherein the obtaining comprises calculating, in the network node, the estimated crash point of the unmanned aerial vehicle, based on the failure report.

10. The method as claimed in claim 6, wherein the obtaining comprises receiving, from the unmanned aerial vehicle, the estimated crash point.

11. An unmanned aerial vehicle for alerting about a failure, the unmanned aerial vehicle being configured to:
    identify a malfunctioning in the unmanned aerial vehicle, wherein the malfunctioning comprising low battery voltage or lack of fuel, and
    transmitting to a network node, a failure report, wherein the failure report comprises the malfunctioning and/or position of the unmanned aerial vehicle.

12. The unmanned aerial vehicle as claimed in claim 11, configured to send audible signals and/or light signals to alert about the malfunctioning.

13. The unmanned aerial vehicle as claimed in claim 11, wherein the failure report further comprising at least one of: altitude of the unmanned aerial vehicle, velocity of the unmanned aerial vehicle, weight of the unmanned aerial vehicle, data related to the unmanned aerial vehicle, temperature.

14. The unmanned aerial vehicle as claimed in claim 11, wherein the failure report further comprises: flying capability or status of the unmanned aerial vehicle, wherein the flying status comprises one of: free falling or semi-controlled landing.

15. The unmanned aerial vehicle as claimed in claim 13, wherein the failure report further comprises: flying capability or status of the unmanned aerial vehicle, wherein the flying status comprises one of: free falling or semi-controlled landing.

* * * * *

UNITED STATES PATENT AND TRADEMARK OFFICE
CERTIFICATE OF CORRECTION

PATENT NO. : 11,756,344 B2
APPLICATION NO. : 17/506356
DATED : September 12, 2023
INVENTOR(S) : Nilsson et al.

Page 1 of 1

It is certified that error appears in the above-identified patent and that said Letters Patent is hereby corrected as shown below:

In the Specification

In Column 1, Line 9, delete "2019," and insert -- 2019, now U.S. Pat. No. 11,195,345, --, therefor.

Signed and Sealed this
Twenty-sixth Day of August, 2025

Coke Morgan Stewart
*Acting Director of the United States Patent and Trademark Office*